(12) United States Patent  
Sakaigawa et al.

(10) Patent No.: US 10,571,746 B2  
(45) Date of Patent: *Feb. 25, 2020

(54) DISPLAY DEVICE

(71) Applicant: Japan Display Inc., Tokyo (JP)

(72) Inventors: Akira Sakaigawa, Tokyo (JP); Kentaro Okuyama, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/414,433

(22) Filed: May 16, 2019

(65) Prior Publication Data

US 2019/0278138 A1  Sep. 12, 2019

Related U.S. Application Data

(63) Continuation of application No. 14/921,060, filed on Oct. 23, 2015, now Pat. No. 10,317,731.

(51) Int. Cl.
*G09G 5/02* (2006.01)
*G02F 1/1335* (2006.01)
(Continued)

(52) U.S. Cl.
CPC ...... *G02F 1/133615* (2013.01); *G02F 1/1326* (2013.01); *G02F 1/1334* (2013.01);
(Continued)

(58) Field of Classification Search
CPC ............. G02F 1/133615; G02F 1/1334; G02F 1/1326; G02F 1/133528;
(Continued)

(56) References Cited

U.S. PATENT DOCUMENTS 6,373,541 B1  4/2002 Sekime et al.
8,237,888 B2  8/2012 Okuyama et al.
(Continued)

FOREIGN PATENT DOCUMENTS

CN    1247326    3/2000
CN  101681057    3/2010
(Continued)

OTHER PUBLICATIONS

Chinese Office Action dated Jan. 9, 2019 in Application No. 201510740261.1.

(Continued)

*Primary Examiner* — Kent W Chang
*Assistant Examiner* — Andrew Lee
(74) *Attorney, Agent, or Firm* — K&L Gates LLP

(57) ABSTRACT

A display device including a first substrate including a plurality of reflection electrodes on a front side of the first substrate, the plurality of reflection electrodes including a first reflection electrode and a second reflection electrode which is farther away from a light source than the first reflection electrode; a second substrate including a transparent electrode on a back side of the second substrate; a light modulation layer which includes a polymer dispersed liquid crystal layer containing a liquid crystalline monomer and liquid crystal molecules dispersed in the liquid crystalline monomer, the light modulation layer being disposed between the plurality of reflection electrodes and the transparent electrode; a drive section driving the plurality of reflection electrodes and the transparent electrode, wherein an application time of a first drive voltage applied between the transparent electrode and the first reflection electrode is shorter than an application time of a second drive voltage applied between the transparent electrode and the second reflection electrode.

8 Claims, 11 Drawing Sheets

(51) Int. Cl.
*G09G 3/34* (2006.01)
*G09G 3/36* (2006.01)
*G02F 1/13* (2006.01)
*G02F 1/1334* (2006.01)

(52) U.S. Cl.
CPC ......... *G09G 3/3406* (2013.01); *G09G 3/3611* (2013.01); *G02F 1/133528* (2013.01); *G02F 2001/13347* (2013.01); *G09G 2300/0456* (2013.01); *G09G 2320/0271* (2013.01); *G09G 2320/0626* (2013.01); *G09G 2330/021* (2013.01); *G09G 2360/144* (2013.01)

(58) Field of Classification Search
CPC ........ G02F 2001/13347; G09G 3/3611; G09G 3/3406; G09G 2330/021; G09G 2320/0626; G09G 2320/0271; G09G 2360/144; G09G 2300/0456
See application file for complete search history.

(56) References Cited

U.S. PATENT DOCUMENTS

| | | | |
|---|---|---|---|
| 8,330,709 B2 | 12/2012 | Uchida et al. | |
| 2009/0208099 A1* | 8/2009 | Yoshii | G06T 5/009 382/167 |
| 2009/0290096 A1* | 11/2009 | Yoon | G02B 6/0036 349/65 |
| 2010/0060825 A1 | 3/2010 | Jang et al. | |
| 2010/0156953 A1 | 6/2010 | Nevitt et al. | |
| 2010/0165450 A1 | 7/2010 | Okuyama et al. | |
| 2010/0225674 A1* | 9/2010 | Choe | G09G 3/3406 345/690 |
| 2011/0096261 A1* | 4/2011 | Kobayashi | G02F 1/1334 349/42 |
| 2011/0141551 A1* | 6/2011 | Uchida | G02F 1/1334 359/316 |
| 2011/0169877 A1 | 7/2011 | Ishida | |
| 2011/0242146 A1 | 10/2011 | Uchida et al. | |
| 2012/0098875 A1 | 4/2012 | Shinkai et al. | |
| 2012/0242232 A1 | 9/2012 | Yata et al. | |
| 2012/0256892 A1* | 10/2012 | Hung | G09G 3/3406 345/207 |
| 2012/0257139 A1* | 10/2012 | Shinkai | G02F 1/133615 349/61 |
| 2012/0274867 A1 | 11/2012 | Shinkai et al. | |
| 2013/0088529 A1* | 4/2013 | Takahashi | G09G 3/003 345/690 |
| 2013/0229595 A1 | 9/2013 | Shinkai et al. | |
| 2013/0258711 A1 | 10/2013 | Okuyama et al. | |
| 2014/0009484 A1* | 1/2014 | Suyama | G09G 3/3611 345/589 |
| 2015/0109547 A1* | 4/2015 | Kim | G02F 1/133305 349/12 |
| 2015/0109763 A1 | 4/2015 | Shinkai et al. | |

FOREIGN PATENT DOCUMENTS

| | | |
|---|---|---|
| CN | 101866075 | 10/2010 |
| CN | 102537774 | 7/2012 |
| CN | 102692746 | 9/2012 |
| JP | 08-114801 | 5/1996 |
| JP | 2000111900 | 4/2000 |
| JP | 2001042329 | 2/2001 |
| JP | 2011142065 | 7/2011 |
| JP | 2012-088486 | 5/2012 |
| WO | 2010035562 | 4/2010 |
| WO | 2012124725 | 9/2012 |

OTHER PUBLICATIONS

Chinese Office Action dated Apr. 25, 2018 in Application No. 2015107402611.

Japanese Office Action dated Mar. 6, 2018 in Application No. 2014-245469.

* cited by examiner

DISPLAY DEVICE

CROSS REFERENCES TO RELATED APPLICATIONS

The present application is a continuation of U.S. patent application Ser. No. 14/921,060 filed on Oct. 23, 2015, which application claims priority to Japanese Priority Patent Application JP 2014-245469 filed in the Japan Patent Office on Dec. 4, 2014, the entire content of which is hereby incorporated by reference.

BACKGROUND

The embodiments discussed herein are related to a display device.

Reflective display devices which perform display by the use of external light, such as the sunlight, have traditionally been known. Such reflective display devices perform display by reflecting incident light from the outside by the use of reflection plates. Accordingly, it is not easy to enhance contrast or improve visibility in a dark place, compared with transmissive display devices.

For example, front light type display devices in which a light source is disposed on this side of a display surface and in which light enters from the front are known. Furthermore, semi-transmissive display devices which are fabricated by placing transmission windows in reflective display devices and in which a backlight disposed on the back side is used are known. In addition, some reflective display devices use display panels in which polymer dispersed liquid crystal (PDLC) is used.

See, for example, Japanese Laid-open Patent Publication No. 2012-88486.

SUMMARY

There is provided a display device whose visibility is improved.

According to an aspect, there is provided a display device including a light modulation layer having predetermined refractive index anisotropy and including plural light modulation areas which differ in responsiveness to an electric field generated by electrodes, a polarization layer which is disposed on a front side of the light modulation layer, on which side external light enters, and which shuts out light other than light whose polarization direction is a predetermined polarization direction, a reflection layer disposed on a back side of the light modulation layer, and a phase retardation layer which is disposed between the polarization layer and the light modulation layer, which creates a predetermined phase difference between incident light and reflected light, and which polarizes the reflected light in a direction different from the predetermined polarization direction, the external light passing through the polarization layer and becoming the incident light, the incident light being reflected from the reflection layer and becoming the reflected light, the light modulation layer transmitting the reflected light at the time of the electric field not being generated, the light modulation layer scattering the reflected light at the time of the electric field being generated.

The object and advantages of the invention will be realized and attained by means of the elements and combinations particularly pointed out in the claims.

It is to be understood that both the foregoing general description and the following detailed description are exemplary and explanatory and are not restrictive of the invention.

Additional features and advantages are described herein, and will be apparent from the following Detailed Description and the figures.

DETAILED DESCRIPTION

Figure 1:
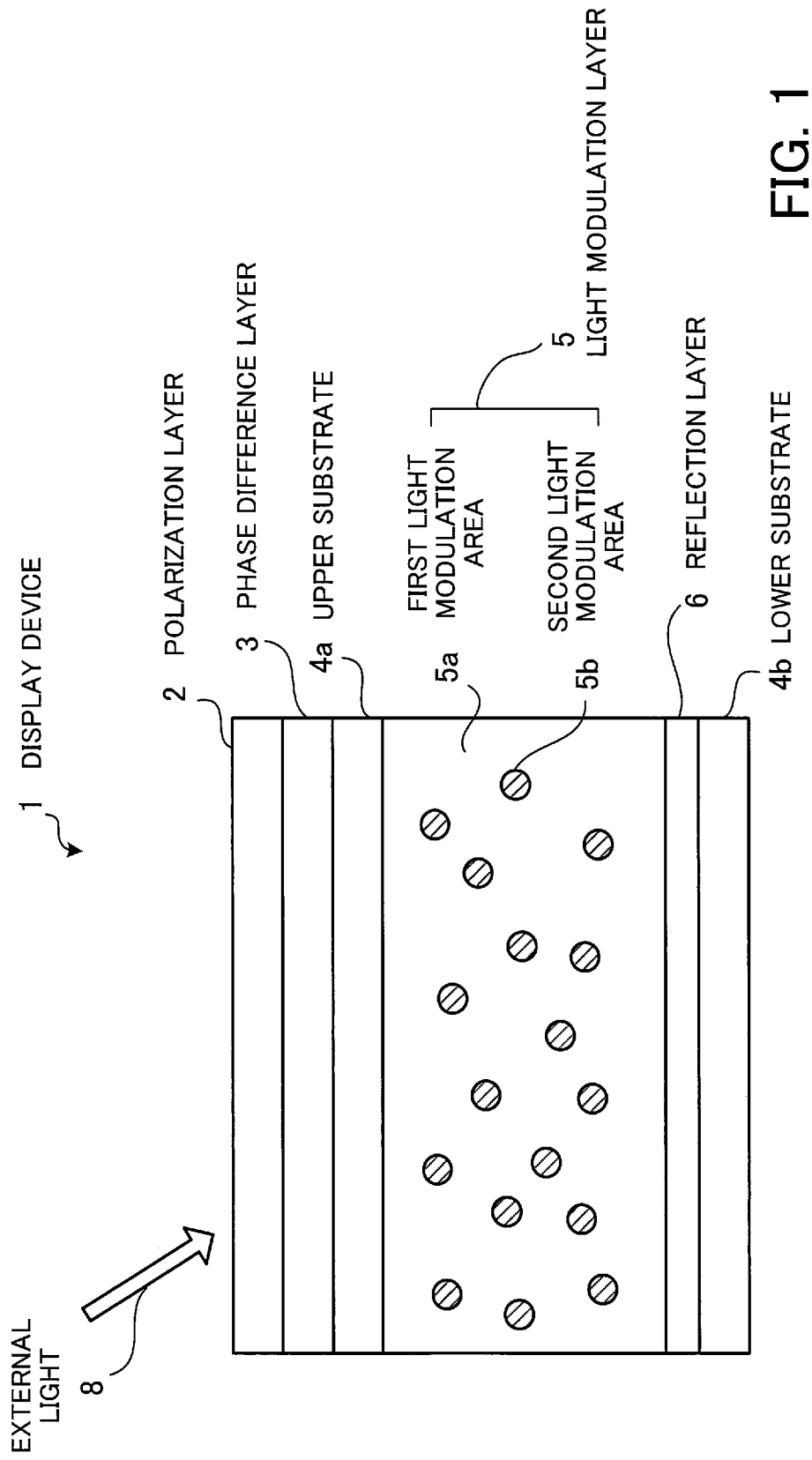
FIG. 1 is a sectional view of an example of the structure of a display device according to a first embodiment.

Embodiments will now be described with reference to the accompanying drawings, wherein like reference numerals refer to like elements throughout.

Disclosed embodiments are simple examples. It is a matter of course that a proper change which suits the spirit of the invention and which will readily occur to those skilled in the art falls within the scope of the present invention. Furthermore, in order to make description clearer, the width, thickness, shape, or the like of each component may schematically be illustrated in the drawings compared with the real state. However, it is a simple example and the interpretation of the present invention is not restricted.

In addition, in the present invention and the drawings the same components that have already been described in previous drawings are marked with the same numerals and detailed descriptions of them may be omitted according to circumstances.

First Embodiment

A display device according to a first embodiment will be described by the use of FIG. 1. FIG. 1 is a sectional view of an example of the structure of a display device according to a first embodiment.

A display device 1 according to a first embodiment is a reflective display device including a light modulation layer 5 sandwiched between and held by an upper substrate 4a and a lower substrate 4b, a polarization layer 2 disposed on the front side of the light modulation layer 5, a reflection layer 6 disposed on the back side of the light modulation layer 5, and a phase retardation layer 3 disposed between the polarization layer 2 and the light modulation layer 5. The display device 1 performs display by reflecting external light 8 which enters the display device 1 by the reflection layer 6.

In the following description it is assumed that a side on which the external light 8 enters is a front and that the opposite side is a back. Furthermore, it is assumed that light which enters the display device 1 from the polarization layer 2 and which travels to the reflection layer 6 is incident light and that light which is reflected from the reflection layer 6 and which travels to the polarization layer 2 is reflected light.

The polarization layer 2 is disposed on the front side of the light modulation layer 5 and shuts out light other than light polarized in a predetermined direction. Components of the external light 8, which is natural light, are shut out by the polarization layer 2, excluding a component polarized in the predetermined direction. The polarization layer 2 transmits only the component polarized in the predetermined direction. Incident light polarized in the predetermined direction enters the phase retardation layer 3 in this way. In addition, reflected light emitted from the phase retardation layer 3 enters the polarization layer 2.

The phase retardation layer 3 is disposed between the polarization layer 2 and the light modulation layer 5. The external light 8 passes through the polarization layer 2 and becomes the incident light. The incident light is reflected from the reflection layer 6. The phase retardation layer 3 creates a predetermined phase difference between the incident light and the reflected light of the incident light. The incident light emitted from the polarization layer 2 is polarized in the predetermined direction. A phase difference is created twice, that is to say, at the time when the incident light enters the phase retardation layer 3 and at the time when the incident light returns to the phase retardation layer 3 as the reflected light. The phase retardation layer 3 shifts the phase twice. By doing so, the phase retardation layer 3 creates a phase difference so that the reflected light emitted to the polarization layer 2 will be polarized in a direction different from a polarization direction of the polarization layer 2.

The upper substrate 4a and the lower substrate 4b hold the light modulation layer 5 from both sides.

The light modulation layer 5 includes a first light modulation area 5a and a second light modulation area 5b each having predetermined refractive index anisotropy. The first light modulation area 5a and the second light modulation area 5b differ in responsiveness to an electric field generated by electrodes. For example, the responsiveness of the second light modulation area 5b to an electric field is relatively high compared with the responsiveness of the first light modulation area 5a to the electric field.

There is little difference in refractive index between the first light modulation area 5a and the second light modulation area 5b in all directions including a front direction and an oblique direction when an electric field is not generated in the above light modulation layer 5. Accordingly, light passes through the light modulation layer 5.

On the other hand, when an electric field is generated in the light modulation layer 5, there is a great difference in refractive index between the first light modulation area 5a and the second light modulation area 5b in all directions. This difference in refractive index corresponds to the difference in responsiveness between them. As a result, reflected light is scattered in the light modulation layer 5. A scattering degree depends on the intensity of an electric field generated by electrodes.

The reflection layer 6 reflects the incident light from the light modulation layer 5 and returns it to the light modulation layer 5 as reflected light. The reflection layer 6 may be, for example, an electrode formed on the lower substrate 4b.

With the display device 1 having the above structure, electrodes are formed so that they will correspond to areas obtained by dividing a display surface, and an electric field is controlled. By doing so, each pixel performs dark display or bright display with one area as one pixel. The dark display is a state in which reflected light is not emitted from the polarization layer 2, and black display is performed. The bright display is a state in which reflected light is emitted from the polarization layer 2, and the color of the reflected light is displayed. If the external light 8 which is natural light enters, then white display is performed. Furthermore, if a color filter is formed on a path from the light modulation layer 5 to the polarization layer 2 along which reflected light travels, the color of the reflected light is converted by the color filter and a color after the conversion is displayed.

The operation of the display device 1 will be described.

When voltage is not applied to electrodes corresponding to a pixel, an electric field is not generated in the light modulation layer 5. Accordingly, there is no difference in refractive index between the first light modulation area 5a and the second light modulation area 5b. As a result, incident light passes through the light modulation layer 5 and enters the phase retardation layer 3 as reflected light. The phase retardation layer 3 polarizes the reflected light to be emitted to the polarization layer 2 in a direction different from a polarization direction of the polarization layer 2, so the polarization layer 2 does not transmit the reflected light. Accordingly, the pixel performs dark display. For example, a $\lambda/4$ phase retardation plate may be used as the phase retardation layer 3 which creates a phase difference in the above way.

On the other hand, when voltage is applied to the electrodes corresponding to the pixel, an electric field is generated in the light modulation layer 5. Accordingly, there is a great difference in refractive index between the first light modulation area 5a and the second light modulation area 5b. As a result, incident light and reflected light are scattered in the light modulation layer 5. Part of scattered light passes through the polarization layer 2 and is emitted to the outside. Accordingly, the pixel performs bright display.

As has been described, the display device 1 is a normally-black mode reflective display device. That is to say, when voltage is not applied to electrodes corresponding to a pixel, the display device 1 performs dark display (black display).

With the display device 1 a pixel performs bright display because reflected light is scattered in the light modulation layer 5. Furthermore, there is a polarized light component which is not scattered. However, when voltage is applied to electrodes corresponding to a pixel, incident light is converted to linearly polarized light by the polarization layer 2 and is converted to circularly polarized light by the phase retardation layer 3. Reflected light of the circularly polarized light is converted by the phase retardation layer 3 to linearly polarized light whose polarization direction is the same as that of the original linearly polarized light, is transmitted by the polarization layer 2, and is emitted from the polarization layer 2. This is the same with ordinary electrically controlled birefringence (ECB) mode. This light emitted from the polarization layer 2 is added to the bright display based on scattered light. As a result, the luminance of a pixel is high in the case of bright display, compared with a display device which merely controls the polarization direction of reflected light. This improves visibility. In addition, scattering layers have traditionally been used for increasing luminance. However, there is no need to form a scattering layer. As a result, a display device becomes thinner.

Second Embodiment

A display device according to a second embodiment will now be described. A display device according to a second embodiment is obtained by adding to the display device 1 according to the first embodiment a light source which operates in a dark place. The details will now be described.

Figure 2:
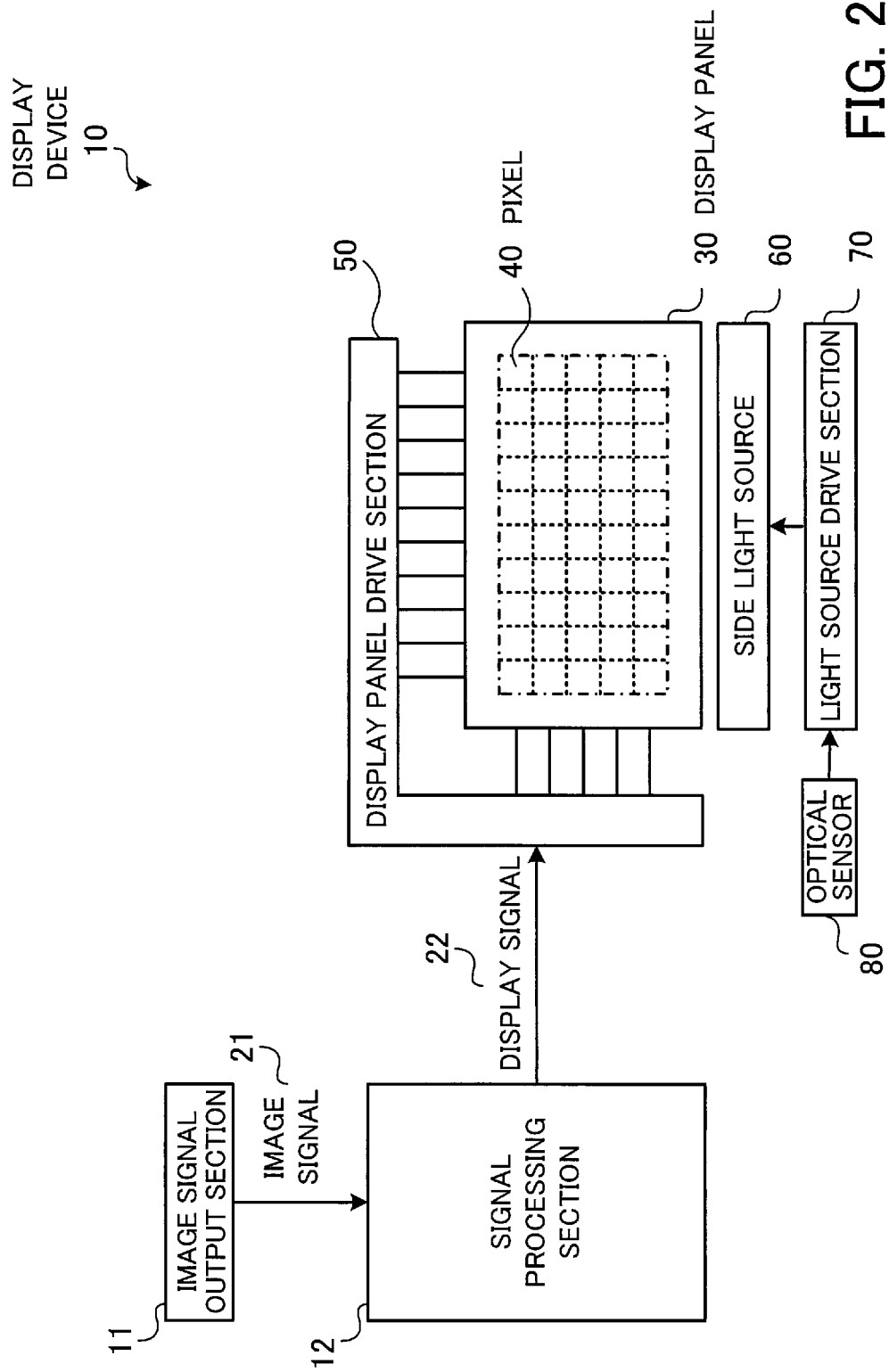
FIG. 2 illustrates an example of the structure of a display device according to a second embodiment.

FIG. 2 illustrates an example of the structure of a display device according to a second embodiment.

A display device 10 illustrated in FIG. 2 includes an image signal output section 11, a signal processing section 12, a display panel 30, a display panel drive section 50, a side light source 60, a light source drive section 70, and an optical sensor 80.

The image signal output section 11 outputs an image signal 21 to the signal processing section 12. Color information corresponding to a display block of the display panel 30 is set in the image signal 21.

The signal processing section 12 generates a display signal 22 to be displayed on the display panel 30 on the basis of the image signal 21, and outputs the display signal 22 to the display panel drive section 50. The signal processing section 12 performs a correction process on the image signal 21.

The display panel 30 performs display with each area obtained by dividing the display surface as a unit for display. It is assumed that this unit for display is a pixel 40. Pixels 40 are arranged like a matrix to form the display surface.

On the basis of the display signal 22, the display panel drive section 50 applies voltage in order to electrodes corresponding to the pixels 40 arranged like a matrix. The display panel drive section 50 then controls the luminance of the pixels 40 according to the intensity of electric fields generated by applying voltage to the electrodes. The display panel drive section 50 is an example of an electrode drive section which drives the electrodes corresponding to the pixels 40.

The side light source 60 is disposed along a side of the plane of the display panel 30. When the side light source 60 is driven, the side light source 60 makes light enter a light modulation layer from the side.

The light source drive section 70 drives the side light source 60 according to ambient illumination detected by the optical sensor 80. The optical sensor 80 is an example of an illumination detection section which detects ambient illumination, and outputs measured ambient illumination to the light source drive section 70. For example, when the optical sensor 80 detects that the surroundings are bright, the light source drive section 70 turns off the side light source 60. As a result, the display device 10 performs reflection display by the use of external light which enters the display device 10 from the outside. Furthermore, when the optical sensor 80 detects that the surroundings are dark, the light source drive section 70 drives the side light source 60 to make light enter the light modulation layer. As a result, the display device 10 performs light emission display by the use of light emitted from the side light source 60. Instead of simply turning on or off the side light source 60, the light source drive section 70 may change the intensity of light emitted from the side light source 60 by stages according to detected illumination. Furthermore, one of the following methods may be used. That is to say, the side light source 60 may be turned on or off by the use of an external switch in place of the optical sensor 80. Alternatively, by monitoring power consumption or the status of use, the light emission intensity of the side light source 60 may properly be controlled to realize an optimum amount of light.

Figure 3:
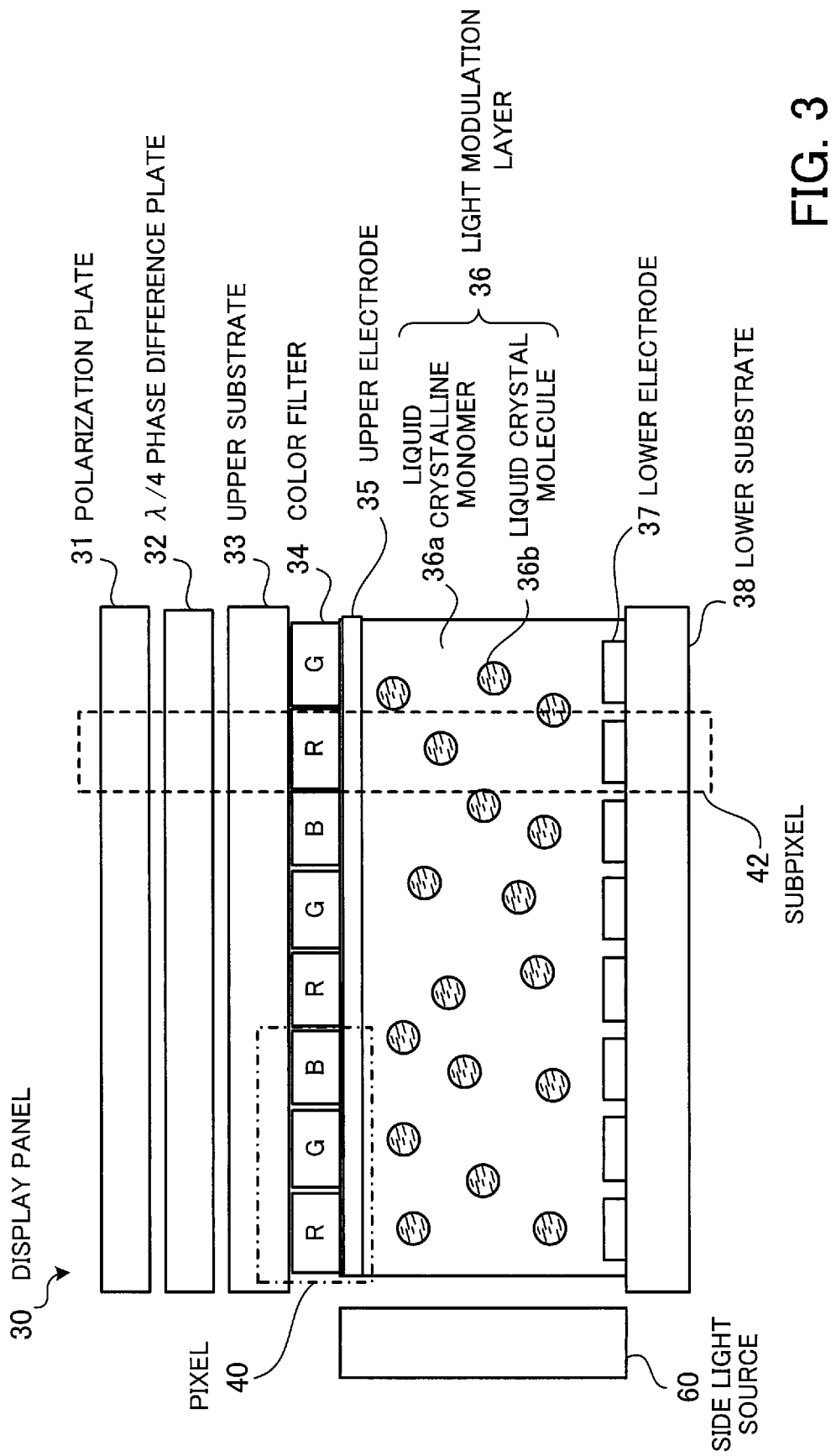
FIG. 3 is a sectional view of an example of the structure of a display panel in the second embodiment.

The structure of the display panel 30 will now be described by the use of FIG. 3. FIG. 3 is a sectional view of an example of the structure of the display panel in the second embodiment. In FIG. 3, there is a space between components for the sake of intelligibility. In reality, however, there may be no space between components.

The display panel 30 includes a polarization plate 31, a λ/4 phase retardation plate 32, an upper substrate 33, a color filter 34, an upper electrode 35, a light modulation layer 36, a lower electrode 37, and a lower substrate 38 laminated in that order from the front side from which external light enters the display panel 30.

The polarization plate 31 transmits a component of incident light polarized in a predetermined direction and shuts out the other components of the incident light.

The λ/4 phase retardation plate 32 is an example of the phase retardation layer 3 in the first embodiment and has the function of shifting the phase of incident light by a ¼ wavelength. When voltage is not applied to electrodes corresponding to a pixel 40, the phase of external light shifts by a ¼ wavelength before it enters the display panel 30 and after it is reflected. That is to say, the phase of reflected light which has passed through the λ/4 phase retardation plate 32 shifts from the phase of light which has passed through the polarization plate 31 and which enters the λ/4 phase retardation plate 32 by λ/4+λ/4=λ/2. In other words, light polarized in a predetermined direction as incident light by the polarization plate 31 passes through the λ4 phase retardation plate 32 twice, that is to say, when it enters the display panel 30 and when it is reflected. As a result, the light is converted to polarized light polarized in a direction different from the predetermined direction. Accordingly, at this time black display is performed.

The upper substrate 33 and the lower substrate 38 hold the light modulation layer 36 from both sides. At least the upper substrate 33 is transparent to visible light. A material for the upper substrate 33 is a glass plate, a resin substrate, or the like. A reflection layer is formed on the light modulation layer 36 side of the lower substrate 38. Accordingly, the lower substrate 38 may be a transparent substrate or may not be a transparent substrate. The color filter 34 and the upper electrode 35 are formed over the upper substrate 33. On the other hand, the lower electrode 37 is formed over the lower substrate 38.

The color filter 34 separates reflected light emitted from the light modulation layer 36 into lights of predetermined colors and emits them to the upper substrate 33. In the example of FIG. 3, the pixel 40, which is a unit for display, is made up of red (R), green (G), and blue (B) color filters included in the color filter 34. An area corresponding to each color is a subpixel 42. This structure is an example. For example, a pixel may be made up of R, G, B, and white color filters. Furthermore, a pixel may be made up of other color filters, such as a cyan color filter, a magenta color filter, and a yellow color filter.

When voltage is applied between the upper electrode 35 and the lower electrode 37, an electric field is generated in the light modulation layer 36 between the upper electrode 35 and the lower electrode 37. The upper electrode 35 is formed by the use of a transparent material such as indium tin oxide (ITO). The lower electrode 37 is formed by the use of a metal material or the like and also functions as a reflection plate which reflects incident light that has passed through the light modulation layer 36. The shape of the upper electrode 35 and the lower electrode 37 depends on a drive method. Regardless of which drive method is adopted, however, an electric field can be generated independently in the light modulation layer 36 with the subpixel 42 as a drive unit. In the second embodiment it is assumed that the upper electrode 35 is formed by forming a film on the whole surface (that is to say, shaping is not performed after the formation of a film), that the lower electrode 37 corresponds to the subpixel 42, is minute, and has a square shape, and that each lower electrode 37 is controlled by active matrix drive. Another drive method, such as simple matrix drive, may be adopted, of course.

The light modulation layer 36 includes light modulation areas of two types. The light modulation areas of two types are equal in refractive index anisotropy and are different in responsiveness to an electric field. With the display panel 30 illustrated in FIG. 3, the light modulation layer 36 is a composite layer containing a liquid crystalline monomer 36a and liquid crystal molecules 36b dispersed in the liquid crystalline monomer 36a. The liquid crystalline monomer 36a and the liquid crystal molecules 36b are equal in ordinary refractive index and extraordinary refractive index. For example, refractive index deviation caused by manufacturing errors or the like is allowable. On the other hand, the responsiveness of the liquid crystal molecules 36b to an electric field is higher than the responsiveness of the liquid crystalline monomer 36a to the electric field. For example, the liquid crystalline monomer 36a has a striped structure or a porous structure which does not respond to an electric field or has a rod-like structure whose speed of a response to an electric field is slower than the speed of a response of the liquid crystal molecules 36b to the electric field. The liquid crystalline monomer 36a is an example of the first light modulation area 5a and the liquid crystal molecule 36b is an example of the second light modulation area 5b.

Figure 4A:
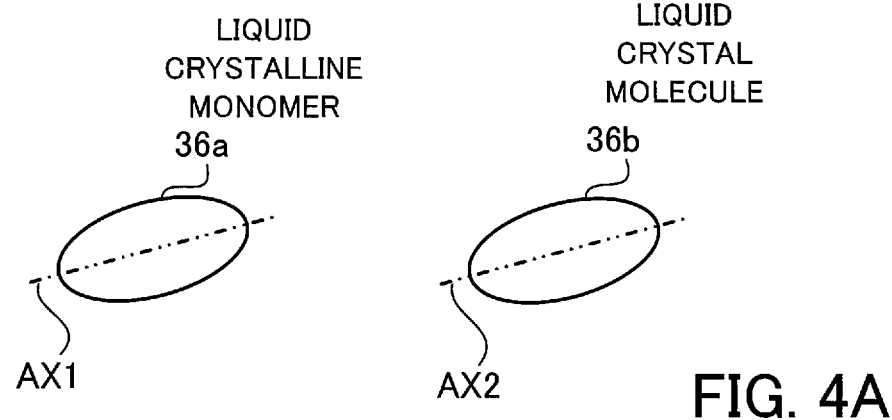
FIGS. 4A and 4B are views for describing a light modulation layer in the second embodiment.
Figure 4B:
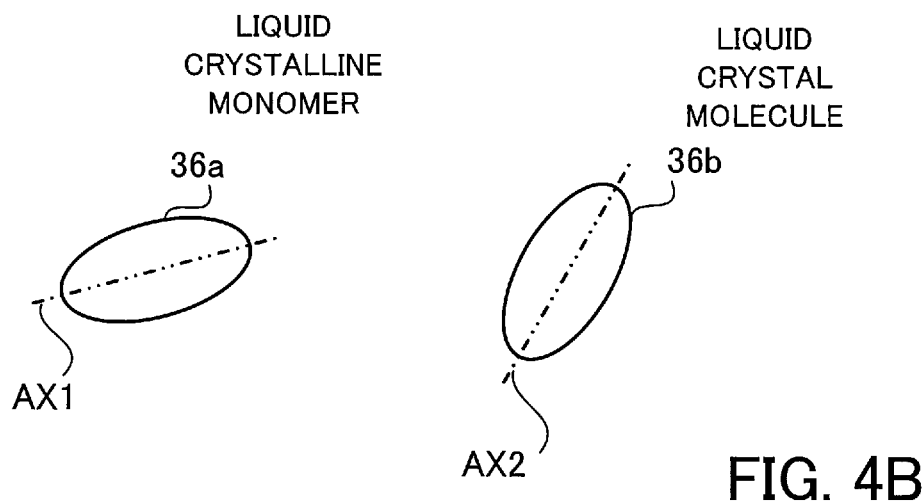

The light modulation layer 36 will now be described by the use of FIGS. 4A and 4B. FIGS. 4A and 4B are views for describing the light modulation layer in the second embodiment. FIG. 4A illustrates an example of the state of the light modulation layer at the time of voltage not being applied. FIG. 4B illustrates an example of the state of the light modulation layer at the time of voltage being applied. In FIGS. 4A and 4B, the refractive index anisotropy of each light modulation area contained in the light modulation layer 36 is represented by the use of a refractive index ellipsoid. This refractive index ellipsoid represents the refractive indices of linearly polarized light which enters from various directions as a tensor ellipsoid. By viewing a section of the refractive index ellipsoid from a direction in which light enters, a refractive index is geometrically known.

As illustrated in FIG. 4A, for example, the direction of an optical axis AX1 of a liquid crystalline monomer 36a and the direction of an optical axis AX2 of a liquid crystal molecule 36b match (optical axis AX1 of the liquid crystalline monomer 36a and the optical axis AX2 of the liquid crystal molecule 36b are parallel to each other) in a state in which voltage is not applied between a lower electrode 37 and the upper electrode 35 corresponding to a subpixel 42 and in which an electric field is not generated in the light modulation layer 36. Each of the optical axes AX1 and AX2 is parallel to a light traveling direction which makes a refractive index constant regardless of a polarization direction. There may be a slight deviation between the direction of the optical axis AX1 and the direction of the optical axis AX2 due to manufacturing errors or the like.

As illustrated in FIG. 4B, on the other hand, the direction of an optical axis AX1 of the liquid crystalline monomer 36a and the direction of an optical axis AX2 of the liquid crystal molecule 36b intersect in a state in which voltage is applied between the lower electrode 37 and the upper electrode 35 and in which an electric field is generated in the light modulation layer 36.

Figure 5A:
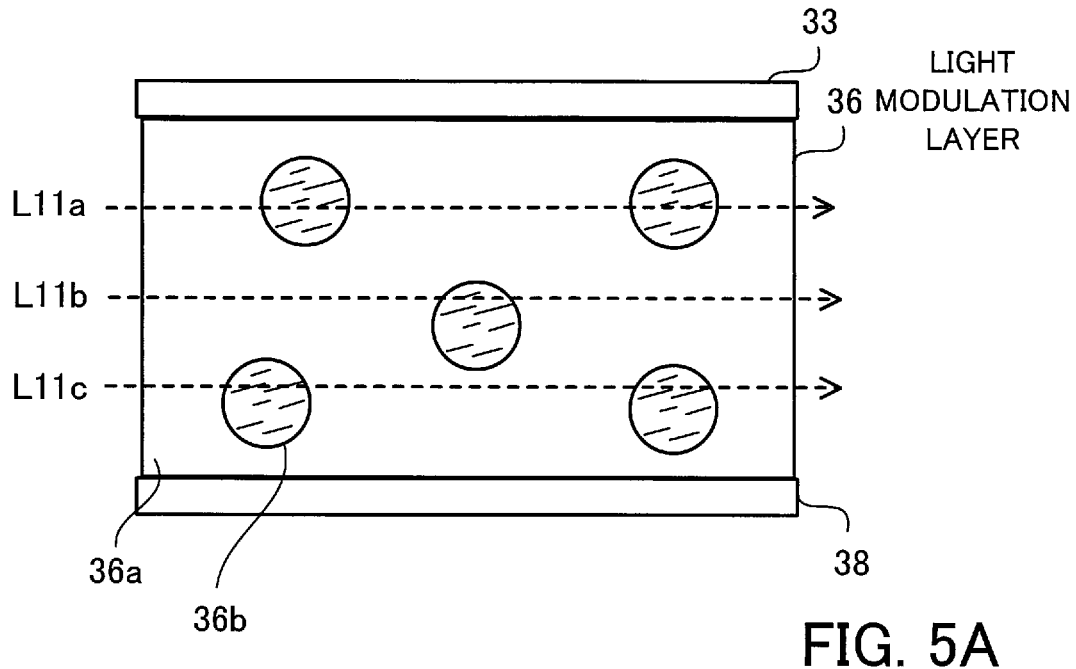
FIGS. 5A and 5B are schematic views for describing the function of the light modulation layer in the second embodiment.
Figure 5B:
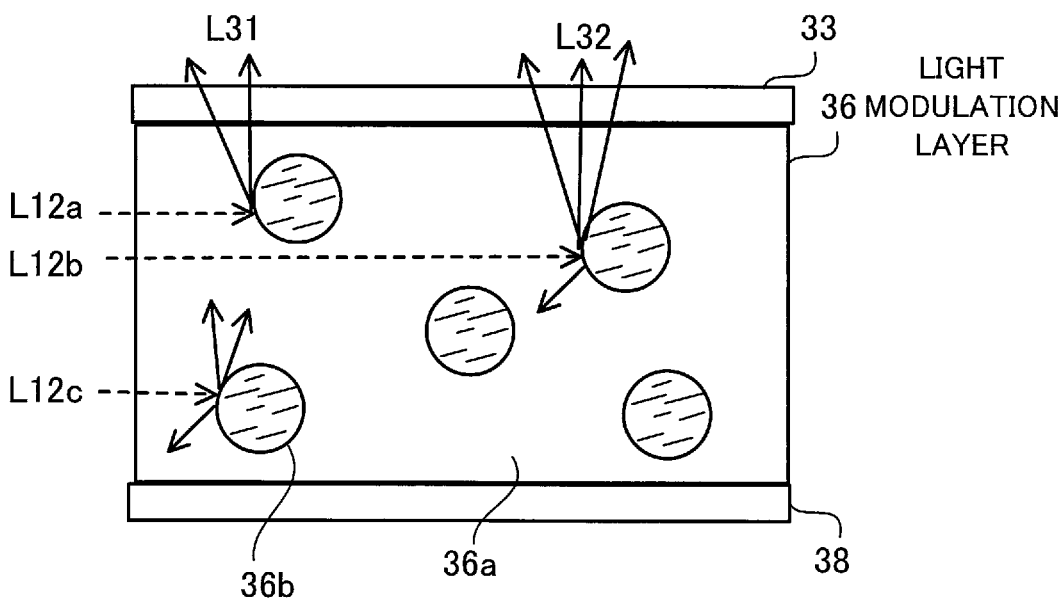

The function of the light modulation layer 36 will be described by the use of FIGS. 5A and 5B. FIGS. 5A and 5B are schematic views for describing the function of the light modulation layer in the second embodiment. FIG. 5A is a schematic view for describing the function of the light modulation layer in a state in which voltage is not applied. FIG. 5B is a schematic view for describing the function of the light modulation layer in a state in which voltage is applied. In FIGS. 5A and 5B, the upper electrode 35, the lower electrode 37, and the color filter 34 are not illustrated. Furthermore, in order to control an electric field in the light modulation layer 36, the upper electrode 35 and the lower electrode 37 are synchronized and driven by applying voltage. In the following description, however, for the sake of simplicity the operation of generating an electric field may be indicated by the application of voltage to electrodes.

In the state of FIG. 5A in which voltage is not applied, voltage is not applied between the upper electrode 35 and the lower electrode 37 and an electric field is not generated in the light modulation layer 36. In this state, as illustrated in FIG. 4A, the direction of the optical axis AX1 of the liquid crystalline monomer 36a and the direction of the optical axis AX2 of the liquid crystal molecule 36b match and there is little difference in refractive index in all directions including a front direction and an oblique direction. Accordingly, for example, incident lights L11a, L11b, and L11c which are indicated by chain lines, which are emitted from the side light source 60, and which enter the light modulation layer 36 from the side pass through the light modulation layer 36 without being scattered in the light modulation layer 36. Light which is emitted from the side light source 60 and which travels to the lower substrate 38 or the upper substrate 33 is totally reflected and is not emitted to the outside. As has been described, when voltage is not applied between the upper electrode 35 and the lower electrode 37, the light modulation layer 36 does not emit light emitted from the side light source 60 to the upper substrate 33 side. As a result, dark display is performed on the display surface.

In the state of FIG. 5B in which voltage is applied, on the other hand, voltage is applied between the upper electrode 35 and the lower electrode 37 and an electric field is generated in the light modulation layer 36. In this state, as illustrated in FIG. 4B, the direction of the optical axis AX1 of the liquid crystalline monomer 36a and the direction of the optical axis AX2 of the liquid crystal molecule 36b intersect and there is a great difference in refractive index in all directions including a front direction and an oblique direction. As a result, a powerful scattering property is obtained. For example, incident lights L12a, L12b, and L12c which are emitted from the side light source 60 and which enter the light modulation layer 36 from the side are scattered in the light modulation layer 36 and scattered lights L31 and L32 are emitted from the upper substrate 33. As a result, scattered light which has passed through the upper substrate 33 is polarized in all directions. Part of the scattered light passes through the polarization plate 31 and is emitted to the outside.

It is assumed that the side light source 60 included in the display device 10 having the above structure is driven in a dark place. In a state in which voltage is not applied to electrodes corresponding to a subpixel 42, as illustrated in FIG. 5A, light emitted from the side light source 60 passes through the light modulation layer 36 in a direction parallel to the display surface and is not emitted from the upper substrate 33. On the other hand, in a state in which voltage is applied to the electrodes corresponding to the subpixel 42, as illustrated in FIG. 5B, light emitted from the side light source 60 is scattered in the light modulation layer 36 and part of scattered light is emitted from the upper substrate 33.

In FIGS. 5A and 5B, a case where light emitted from the side light source 60 enters the light modulation layer 36 from the side is described. However, the same applies to external light which enters the light modulation layer 36 from the front side. That is to say, in a state in which voltage is not applied to corresponding electrodes and an electric field is not generated in the light modulation layer 36, black display is performed. In a state in which voltage is applied to corresponding electrodes and an electric field is generated in the light modulation layer 36, bright display is performed.

The display device 10 operates in this way in normally black mode.

Figure 6:
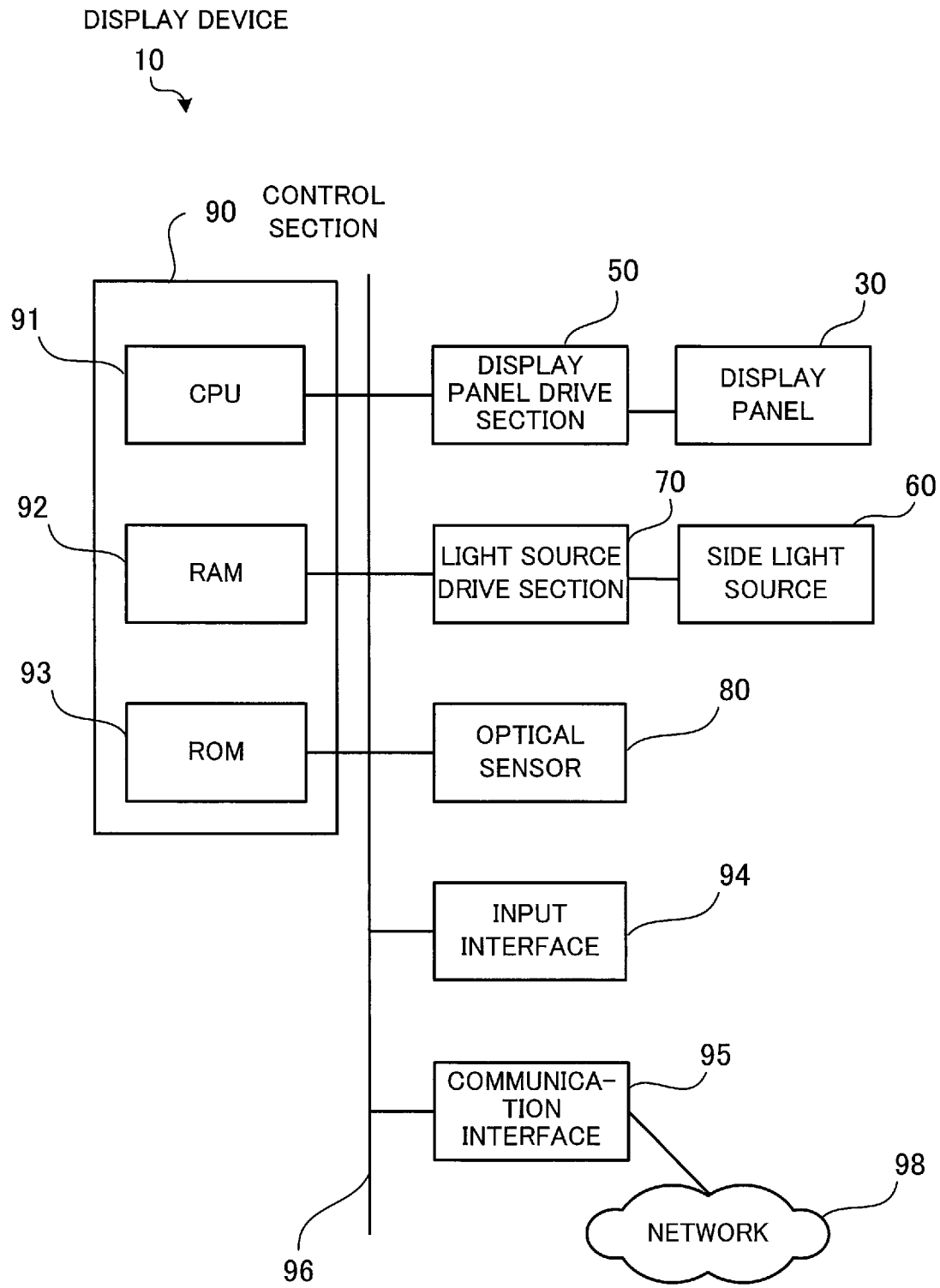
FIG. 6 illustrates the hardware configuration of the display device according to the second embodiment.

The hardware configuration will now be described by the use of FIG. 6. FIG. 6 illustrates the hardware configuration of the display device according to the second embodiment.

The whole of the display device 10 is controlled by a control section 90. The control section 90 includes a central processing unit (CPU) 91. A random access memory (RAM) 92, a read only memory (ROM) 93, and a plurality of peripheral units are coupled to the CPU 91 via a bus 96.

The CPU 91 is a processor which realizes the processing functions of the control section 90.

The RAM 92 is used as main storage of the control section 90. The RAM 92 temporarily stores at least part of an operating system (OS) program or an application program executed by the CPU 91. In addition, the RAM 92 stores various pieces of data which the CPU 91 needs to perform a process.

The ROM 93 is a read only semiconductor memory and stores the OS program, application programs, and fixed data which is not rewritten. Furthermore, a semiconductor memory, such as a flash memory, may be used as auxiliary storage in place of or in addition to the ROM 93.

The plurality of peripheral units coupled to the bus 96 are the display panel drive section 50, the light source drive section 70, the optical sensor 80, an input interface 94, and a communication interface 95.

The display panel 30 is coupled to the display panel drive section 50.

The side light source 60 is coupled to the light source drive section 70.

The optical sensor 80 informs the CPU 101 or the light source drive section 70 via the bus 96 of measured illumination.

An input device used for inputting a user's instructions and an interface used for acquiring an image signal from another apparatus are coupled to the input interface 94. The input interface 94 transmits to the CPU 91 a signal transmitted from the input device or another apparatus.

The communication interface 95 is coupled to a network 98. The communication interface 95 transmits data to or receives data from another computer or a communication apparatus via the network 98.

By adopting the above hardware configuration, the processing functions in the second embodiment are realized. The above configuration is an example and is changed properly.

The processing functions of the image signal output section 11 and the signal processing section 12 illustrated in FIG. 2 are realized by the control section 90.

The operation of the display device 10 having the above structure will be described.

The display device 10 measures ambient illumination by the optical sensor 80 and turns on or off the side light source 60 according to the illumination detected by the optical sensor 80. In a bright place the display device 10 turns off the side light source 60 and performs reflection display by the use of external light which enters the display device 10 from the outside. In a dark place the display device 10 turns on the side light source 60 and performs light emission display by the use of light emitted from the side light source 60. Furthermore, one of the following methods may be used. That is to say, the side light source 60 may be turned on or off by the use of an external switch in place of the optical sensor 80. Alternatively, by monitoring power consumption or the status of use, the light emission intensity of the side light source 60 may properly be controlled to realize an optimum amount of light.

Reflection display and light emission display by the display device 10 will now be described by the use of FIGS. 7 and 8. Components in FIGS. 7 and 8 which are the same as those illustrated in FIG. 3 are marked with the same numerals and their descriptions will be omitted.

The reflection display which is performed in a bright place with the side light source 60 turned off will be described first. FIG. 7 is a schematic view of reflection display by the display device according to the second embodiment. A dashed line in FIG. 7 indicates an area of each subpixel.

External lights L21 and L22 which enter the display panel 30 from the outside are reflected from the lower electrode 37 which also functions as a reflection plate and reflected lights obtained in this way are used for performing the reflection display.

Figure 7:
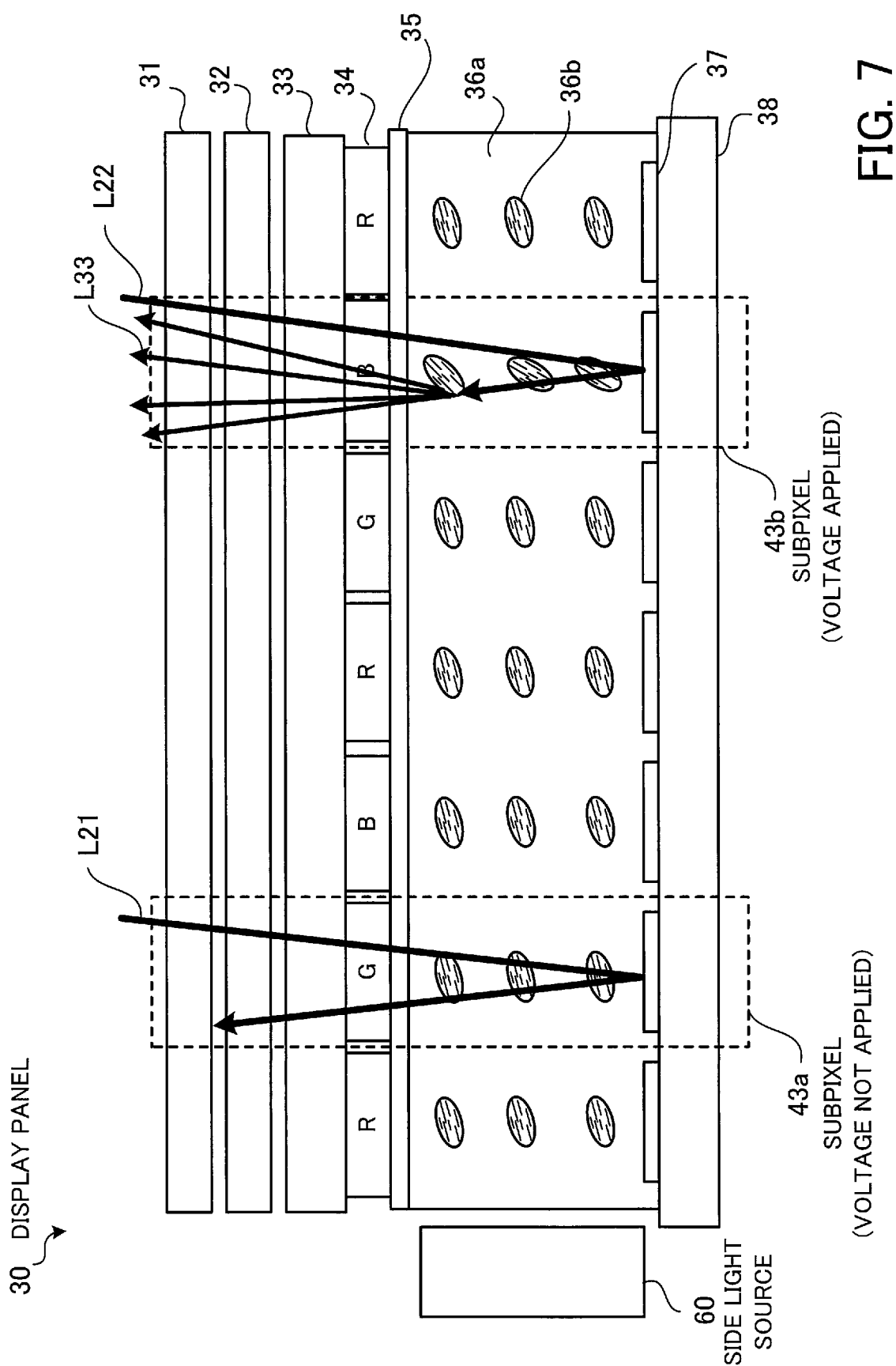
FIG. 7 is a schematic view of reflection display by the display device according to the second embodiment.

In the example of FIG. 7, a subpixel 43a is in a state in which voltage is not applied to corresponding electrodes and a subpixel 43b is in a state in which voltage is applied to corresponding electrodes.

In the light modulation layer 36 corresponding to the subpixel 43a in a state in which voltage is not applied to the corresponding electrodes, the direction of an optical axis of the liquid crystalline monomer 36a and the direction of an optical axis of a liquid crystal molecule 36b match and there is little difference in refractive index. Accordingly, the external light L21 which enters an area of the light modulation layer 36 corresponding to the subpixel 43a travels to the lower electrode 37 without being scattered, and is reflected. Similarly, reflected light of the external light L21 travels to the λ/4 phase retardation plate 32 without being scattered. The phase is shifted by the λ/4 phase retardation plate 32 twice, that is to say, when the external light L21 enters the display panel 30 and when the external light L21 is reflected. As a result, the reflected light which has passed through the λ/4 phase retardation plate 32 is polarized in a direction different from a polarization direction of the polarization plate 31. Therefore, the reflected light which has passed through the λ/4 phase retardation plate 32 is not emitted from the polarization plate 31. That is to say, the subpixel 43a performs black display.

In the light modulation layer 36 corresponding to the subpixel 43b in a state in which voltage is applied to the corresponding electrodes, the direction of an optical axis of the liquid crystalline monomer 36a and the direction of an optical axis of a liquid crystal molecule 36b differ from each other, so there is a great difference in refractive index in all directions. As a result, reflected light is scattered in the light modulation layer 36. Part of components of scattered light L33 which travel to the front side pass through the color filter 34 and are emitted from the polarization plate 31. A blue color filter is disposed in an area of the color filter 34 corresponding to the subpixel 43b, so the subpixel 43b displays blue (B). Furthermore, there is a polarized light component which is not scattered. However, when voltage is applied to electrodes corresponding to a pixel, incident light is converted to linearly polarized light by the polarization plate 31 and is converted to circularly polarized light by the λ/4 phase retardation plate 32. Reflected light of the circularly polarized light is converted by the λ/4 phase retardation plate 32 to linearly polarized light whose polarization direction is the same as that of the original linearly polarized light, is transmitted by the polarization plate 31, and is emitted from the polarization plate 31. This is the same with the ordinary ECB mode. The light emitted from the polarization plate 31 is added to bright display based on scattered light.

The light emission display which is performed in a dark place with the side light source 60 turned on will be described next. FIG. 8 is a schematic view of light emission display by the display device according to the second embodiment. A dashed line in FIG. 8 indicates an area of each subpixel.

Light source light L13 emitted from the side light source 60 is used for performing light emission display.

Figure 8:
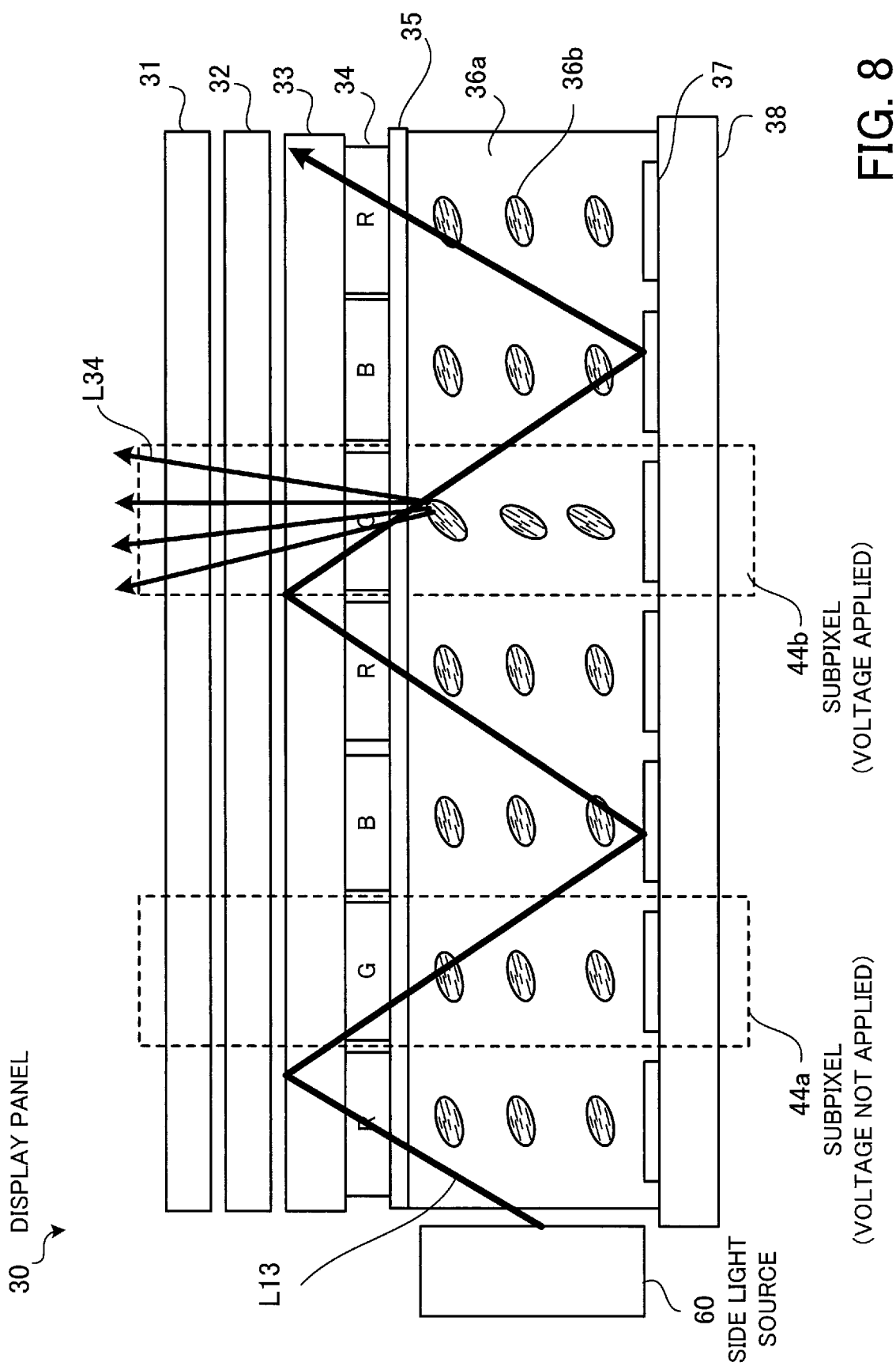
FIG. 8 is a schematic view of light emission display by the display device according to the second embodiment.

In the example of FIG. 8, a subpixel 44a is in a state in which voltage is not applied to corresponding electrodes and a subpixel 44b is in a state in which voltage is applied to corresponding electrodes. The light source light L13 emitted from the side light source 60 is totally reflected repeatedly from the upper substrate 33 and the lower electrode 37 and travels in a horizontal direction in FIG. 8.

In the light modulation layer 36 corresponding to the subpixel 44a in a state in which voltage is not applied to the corresponding electrodes, the direction of an optical axis of the liquid crystalline monomer 36a and the direction of an optical axis of a liquid crystal molecule 36b match and there is little difference in refractive index. Accordingly, the light source light L13 passes through an area of the light modulation layer 36 corresponding to the subpixel 44a without being scattered. As a result, light is not emitted from the subpixel 44a and the subpixel 44a performs black display.

In the light modulation layer 36 corresponding to the subpixel 44b in a state in which voltage is applied to the corresponding electrodes, the direction of an optical axis of the liquid crystalline monomer 36a and the direction of an optical axis of a liquid crystal molecule 36b differ from each other, so there is a great difference in refractive index in all directions. As a result, the light source light L13 which enters an area of the light modulation layer 36 corresponding to the subpixel 44b is scattered. Part of components of scattered light L34 which travel to the front side pass through the color filter 34 and are emitted from the polarization plate 31. A green color filter is disposed in an area of the color filter 34 corresponding to the subpixel 44b, so the subpixel 44b displays green (G).

As has been described, the display device 10 includes the light modulation layer 36 which transmits incident light at the time of voltage not being applied to electrodes and which scatters incident light at the time of voltage being applied to electrodes. As a result, the display device 10 performs reflection display and light emission display in the normally black mode. With bright display in which a color of the color filter 34 is displayed, light is scattered in the light modulation layer 36. Accordingly, the display device 10 can realize high luminance, compared with a display device which performs bright display only by manipulating the polarization direction of reflected light.

In the above description the reflection display and the light emission display are separated. However, the display device 10 can perform reflection display and light emission display at the same time. As illustrated in FIGS. 7 and 8, for example, the subpixels 43a and 44a in a state in which voltage is not applied to the corresponding electrodes transmit the external light L21 and the light source light L13 and do not emit the external light L21 and the light source light L13, respectively, to the outside. The subpixels 43b and 44b in a state in which voltage is applied to the corresponding electrodes scatter external light L22 and the light source light L13, respectively, and emit lights which pass through the color filter 34.

Therefore, for example, even if the intensity of light emitted from the side light source 60 to the light modulation layer 36 is changed by stages according to ambient illumination obtained from the optical sensor 80, a high luminance image is obtained in bright display. Furthermore, with the display device 10 it is possible to enhance contrast by high luminance in bright display. This improves visibility.

By the way, with the display device 10 the side light source 60 is disposed at an end of the light modulation layer 36. Accordingly, there is a tendency for the luminance of each pixel 40 obtained from the side light source 60 to increase as the distance from the side light source 60 decreases and to decrease as the distance from the side light source 60 increases.

Therefore, when the display device 10 turns on the side light source 60 to perform light emission display, the display device 10 drives electrodes corresponding to each pixel 40 on the basis of color information for each pixel 40 based on an image signal and the luminance of each pixel 40 obtained from the side light source 60. For example, when the display device 10 drives electrodes in light emission display, the display device 10 may estimate the amount of a decrease in the luminance of each pixel 40 caused by an increase in the distance from the side light source 60 and correct gradation values of the display signal 22, drive voltage applied to electrodes, or drive time according to the amount of a decrease in the luminance of each pixel 40. Alternatively, the structure of electrodes may be changed according to the distance from the side light source 60. These techniques will now be described in order.

First the technique of controlling the driving of electrodes corresponding to a pixel 40 according to the distance between the side light source 60 and the pixel 40 will be described. Correction made by the display panel drive section 50 will be described as an example.

Figure 9:
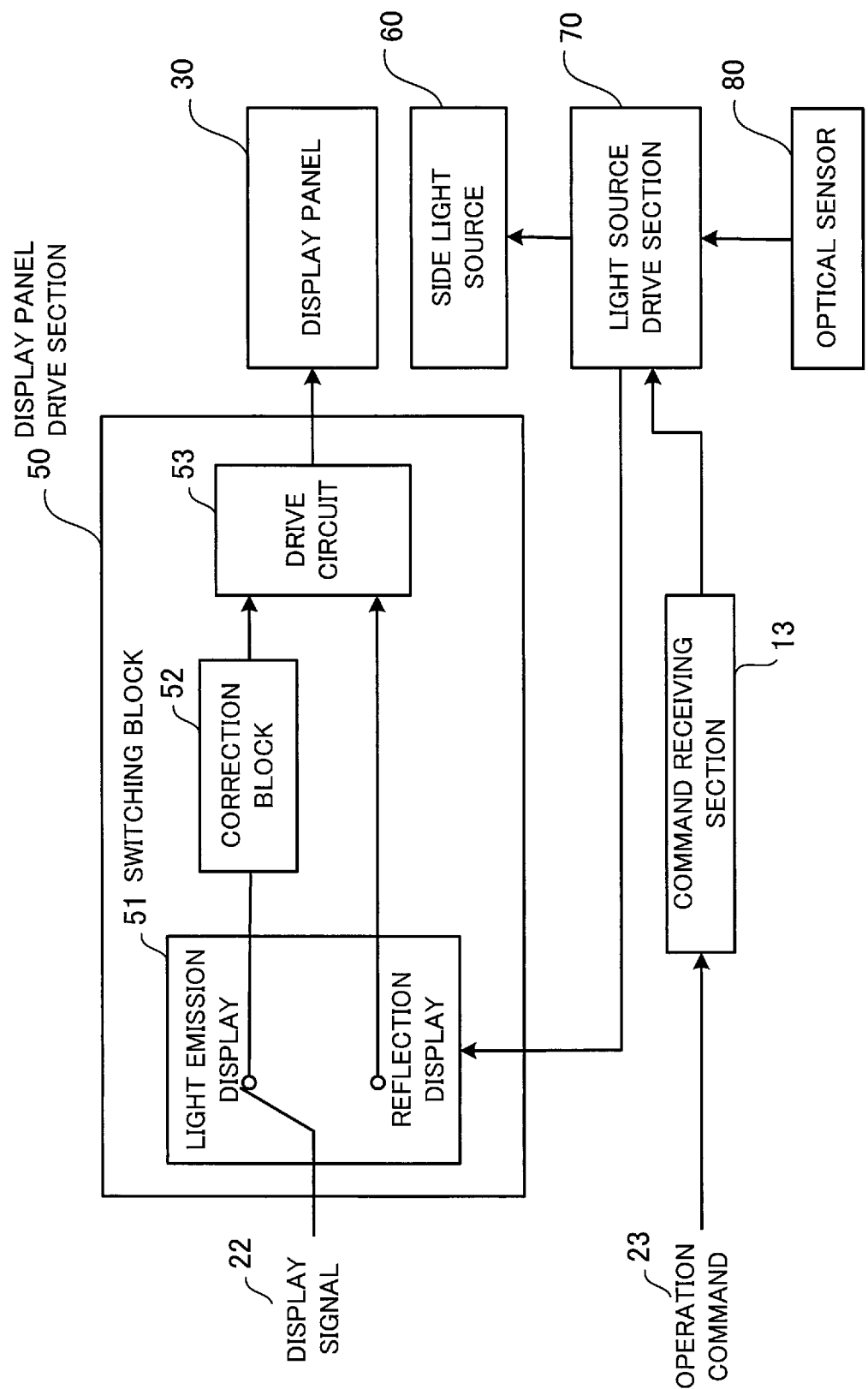
FIG. 9 illustrates the structure of a display panel drive section in the second embodiment.

FIG. 9 illustrates the structure of the display panel drive section in the second embodiment. Components in FIG. 9 which are the same as those illustrated in FIG. 2 are marked with the same numerals and their descriptions will be omitted.

The display panel drive section 50 includes a switching block 51, a correction block 52, and a drive circuit 53. Furthermore, in the example of FIG. 9, a command receiving section 13 which transmits a user's instructions to the light source drive section 70 is included.

The switching block 51 switches the operation mode of the display panel drive section 50 to light emission display or reflection display. A signal which is indicative of whether the side light source 60 is on or off is inputted from the light source drive section 70 to the switching block 51. The switching block 51 determines on the basis of this signal whether or not the side light source 60 is on. When the side light source 60 is off, the switching block 51 selects reflection display. When the side light source 60 is on, the switching block 51 selects light emission display.

When the switching block 51 selects reflection display, the display signal 22 is transmitted to the drive circuit 53. Furthermore, when the switching block 51 selects light emission display, the display signal 22 is transmitted to the correction block 52 to make correction. In the following description it is assumed that a signal which is outputted to the drive circuit 53 via the correction block 52 at the time of the switching block 51 selecting light emission display is a signal for light emission display and that a signal which is outputted to the drive circuit 53 at the time of the switching block 51 selecting reflection display is a signal for reflection display.

When the display signal 22 is inputted to the correction block 52 via the switching block 51, the correction block 52 corrects the display signal 22 according to the luminance of a target pixel 40 obtained from the side light source 60, and outputs it to the drive circuit 53 as a signal for light emission display. When the switching block 51 selects reflection display, the correction block 52 may stop processing.

The signal for light emission display or a signal for reflection display selected by the switching block 51 is inputted to the drive circuit 53. The drive circuit 53 controls the driving of the display panel 30 on the basis of the signal for light emission display inputted from the correction block 52 or the signal for reflection display.

The command receiving section 13 accepts an operation command regarding driving the side light source 60, such as turning on or off the side light source 60, and informs the light source drive section 70 about the contents of the operation command.

The correction block 52 will be described. The correction block 52 makes a correction according to the luminance of a target pixel 40 obtained from the side light source 60 on the basis of the display signal 22 for the target pixel 40 and the distance between the target pixel 40 and the side light source 60.

One method is to divide the display area into several blocks according to the distance from the side light source 60 and to control drive voltage to be applied to electrodes according to blocks. For example, drive voltage for displaying white is determined in advance for each block. This drive voltage is determined in advance so as to establish the relationship $$V1<V2<\ldots<Vn \quad (1)$$

where V1 is white display voltage for a pixel in a block which is the closest to the side light source 60, V2 is white display voltage for a pixel in a block which is the second closest to the side light source 60, and Vn is white display voltage for a pixel in an nth (n is any integer) block which is the most distant from the side light source 60.

The correction block 52 acquires white display voltage for a block to which the target pixel 40 belongs, and corrects the display signal 22 for the target pixel 40 on the basis of the white display voltage to generate a signal for light emission display. For example, the correction block 52 finds the signal for light emission display by adding a correction amount corresponding to the white display voltage to gradation values of the display signal 22.

Alternatively, the signal for light emission display may designate at least one of drive voltage and drive time at the time of the drive circuit 53 applying voltage to electrodes corresponding to the target pixel 40.

With inequality (1) white display voltage is determined in advance according to blocks. However, white display voltage may be determined in advance according to pixel columns. A pixel column means a column of pixels arranged in a direction parallel to a side of the display surface beside which the side light source 60 is disposed.

Furthermore, a correction may be made by the use of luminance information in which information regarding luminance obtained for each pixel 40 is associated with the distance between each pixel 40 and the side light source 60 or the position of each pixel 40 and which is stored in advance. Furthermore, for example, information regarding white display voltage associated with each pixel 40 may be stored in advance in place of the luminance information. In addition, information regarding an optimum correction amount may be stored in advance. These pieces of table information may be stored in advance by associating them with the blocks or the pixel columns.

With the above method white display voltage is set for each block or each pixel column. However, luminance distribution may be analyzed and white display voltage may be considered as a function of the distance between a pixel and the side light source 60. For example, white display voltage Vm for any pixel m is defined by $$Vm=Vx-\mathrm{LOG}(d) \quad (2)$$

where Vx is white display voltage for a pixel x which is the most distant from the side light source 60, and d is the distance (number of pixels) between the pixel m and the pixel x.

According to expression (2), the white display voltage Vx for the pixel x which is the most distant from the side light source 60 is the maximum drive voltage and the white display voltage Vm falls as the distance from the side light source 60 decreases.

As has been described, with light emission display using the side light source 60, gradation values, drive voltage, or drive time is corrected according to the luminance of a target pixel 40 obtained from the side light source 60 to compensate for the amount of a decrease in luminance. By doing so, display having high visibility and, for example, little color irregularity is obtained.

With the above technique the display panel drive section 50 corrects drive voltage or drive time at the time of driving electrodes corresponding to a target pixel 40 or gradation values or the like.

On the other hand, it is possible to compensate for the amount of a decrease in luminance corresponding to the distance from the side light source 60 by changing the structure of electrodes. For example, electrode area may be changed according to the distance from the side light source 60. That is to say, the area of an electrode which is the most distant from the side light source 60 is maximized and the area of an electrode which is the closest to the side light source 60 is minimized. An increase in electrode area leads to an increase in area of the light modulation layer 36 in which light is scattered. As a result, high luminance is obtained compared with an area where electrode area is small.

Third Embodiment

A display device according to a third embodiment will now be described. The display device 10 according to the second embodiment includes the side light source 60 as a light source which operates in a dark place. However, a display device according to a third embodiment includes a front light as a light source. A display device according to a third embodiment is realized by replacing the display device 10 according to the second embodiment with a front light type display device, and is the same as the display device 10 according to the second embodiment illustrated in FIGS. 2 and 3 in the other respects.

As described in the second embodiment, the use of the side light source 60 has the effect of reducing the thickness of the display device 10. On the other hand, there may be need to reduce not the thickness but the area of the display device 10. A display device according to a third embodiment is suitable for such a case.

Figure 10:
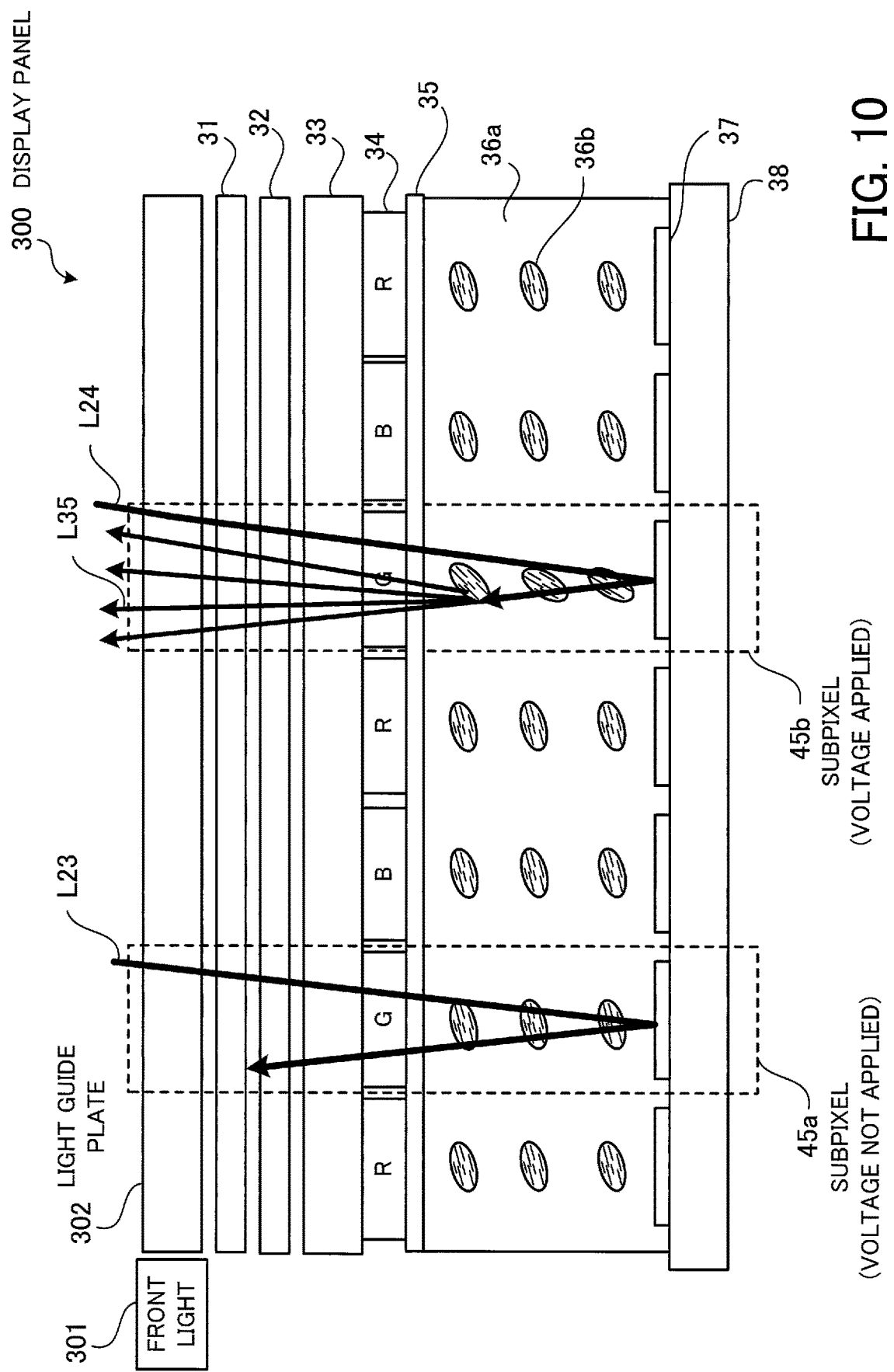
FIG. 10 is a sectional view of an example of the structure of a display panel included in a display device according to a third embodiment.

The structure of a display device according to a third embodiment will be described by the use of FIG. 10. FIG. 10 is a sectional view of an example of the structure of a display panel included in a display device according to a third embodiment. Components in FIG. 10 which are the same as those illustrated in FIG. 2 or 3 are marked with the same numerals and their descriptions will be omitted. FIG. 10 also illustrates reflection display performed by a display device according to a third embodiment.

A display panel 300 included in a display device according to a third embodiment includes a polarization plate 31, a $\lambda/4$ phase retardation plate 32, an upper substrate 33, a color filter 34, an upper electrode 35, a light modulation layer 36, a lower electrode 37, and a lower substrate 38 which are laminated. This is the same with the display panel 30 included in the display device 10 according to the second embodiment. The display panel 300 differs from the display panel 30 in that a light guide plate 302 is disposed on the front side of the polarization plate 31 in place of the side light source 60 and in that a front light 301 is disposed as a light source near one end of the light guide plate 302. Switching between light emission display and reflection display is determined according to ambient illumination detected by an optical sensor 80. This is the same with the second embodiment. That is to say, the display device according to the third embodiment performs reflection display in a bright place with the front light 301 turned off. On the other hand, the display device according to the third embodiment performs light emission display in a dark place with the front light 301 turned on. The front light 301 may be turned on or off by the use of an external switch in place of the optical sensor 80. Alternatively, by monitoring power consumption or the status of use, the light emission intensity of the front light 301 may properly be controlled to realize an optimum amount of light.

Reflection display performed with the front light turned off will be described by the use of FIG. 10. The display device according to the third embodiment performs reflection display in the same way as with the display device 10 illustrated in FIG. 7, excluding the fact that the light guide plate 302 is disposed on the front side of the polarization plate 31. That is to say, in a subpixel 45a in a state in which voltage is not applied to corresponding electrodes, external light L23 passes through the polarization plate 31 and is polarized. The phase of the external light L23 is then shifted by a ¼ wavelength by the $\lambda/4$ phase retardation plate 32 and the external light L23 enters the light modulation layer 36. In the light modulation layer 36 corresponding to the subpixel 45a in which an electric field is not generated, the incident light is reflected. The phase of reflected light is shifted further by a ¼ wavelength by the $\lambda/4$ phase retardation plate 32 and the reflected light enters the polarization plate 31. The reflected light is shut out by the polarization plate 31, so the subpixel 45a performs black display. In a subpixel 45b in a state in which voltage is applied to corresponding electrodes, on the other hand, reflected light is scattered in the light modulation layer 36 and part of scattered light passes through the color filter 34, the $\lambda/4$ phase retardation plate 32, and the polarization plate 31 and is emitted. As a result, the subpixel 45b displays a color of the color filter 34.

Figure 11:
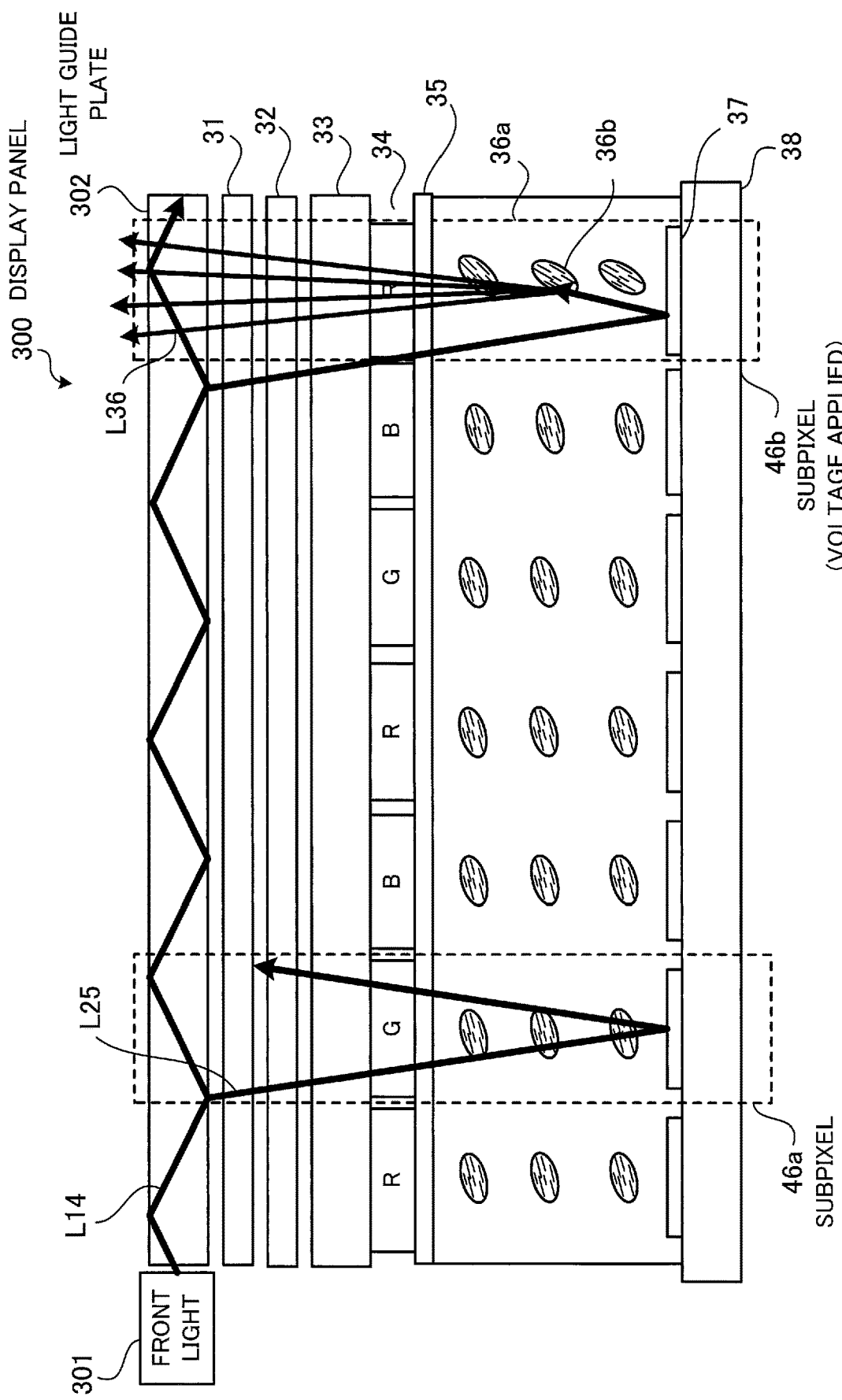
FIG. 11 is a schematic view of light emission display by the display device according to the third embodiment.

Next, light emission display performed with the front light turned on will be described. FIG. 11 is a schematic view of light emission display by the display device according to the third embodiment. A dashed line in FIG. 11 indicates an area of each subpixel.

Light source light L14 emitted from the front light 301 is used for performing light emission display.

In the example of FIG. 11, a subpixel 46a is in a state in which voltage is not applied to corresponding electrodes and a subpixel 46b is in a state in which voltage is applied to corresponding electrodes. The light source light L14 emitted from the front light 301 is totally reflected repeatedly in the light guide plate 302 and travels in a horizontal direction in FIG. 11.

Part of the light source light L14 then enters the polarization plate 31 from the light guide plate 302. As a result, with the display device according to the third embodiment including the front light 301 and the light guide plate 302, operation in light emission display is the same as that in reflection display illustrated in FIG. 10. That is to say, the subpixel 46a in a state in which voltage is not applied to the corresponding electrodes performs black display and the subpixel 46b in a state in which voltage is applied to the corresponding electrodes displays a corresponding color of the color filter 34.

As has been described, the side light source 60 may be replaced with the front light 301 and the light guide plate 302. With the display device according to the third embodiment light is scattered in the light modulation layer 36 in bright display. This is the same with the display device 10 according to the second embodiment. Accordingly, high luminance is obtained and a display device with high visibility is realized.

The above processing functions can be realized with a computer. In that case, a program in which the contents of the functions that the display device has are described is provided. By executing this program on the computer, the above processing functions are realized on the computer. This program may be recorded on a computer readable record medium. A computer readable record medium may be a magnetic storage device, an optical disk, a magneto-optical recording medium, a semiconductor memory, or the like. A magnetic storage device may be a hard disk drive (HDD), a flexible disk (FD), a magnetic tape, or the like. An optical disk may be a digital versatile disc (DVD), a DVD-RAM, a compact disc(CD)-ROM, a CD-recordable(R)/rewritable (RW), or the like. A magneto-optical recording medium may be a magneto-optical disk (MO) or the like.

To place the program on the market, portable record media, such as DVDs or CD-ROMs, on which it is recorded are sold. Alternatively, the program is stored in advance in a storage unit of a server computer and is transferred from the server computer to another computer via a network.

When a computer executes this program, it will store the program, which is recorded on a portable record medium or which is transferred from the server computer, in, for example, its storage unit. Then the computer reads the program from its storage unit and performs processes in compliance with the program. The computer may read the program directly from a portable record medium and perform processes in compliance with the program. Furthermore, each time the program is transferred from the server computer connected via a network, the computer may perform processes in order in compliance with the program it receives.

In addition, at least part of the above processing functions may be realized by an electronic circuit such as a digital signal processor (DSP), an application specific integrated circuit (ASIC), or a programmable logic device (PLD).

Various changes and modifications which fall within the scope of the concept of the present disclosure are conceivable by those skilled in the art and it is understood that these changes and modifications fall within the scope of the present disclosure. For example, those skilled in the art may add components to, delete components from, or make changes in the design of components in each of the above embodiments according to circumstances, or may add processes to, omit processes from, or make changes in conditions in processes in each of the above embodiments according to circumstances. These additions, deletions, changes, and omissions fall within the scope of the present disclosure as long as they include the essentials of the present disclosure.

The present disclosure includes the following aspects.

(1) A display device including: a light modulation layer having predetermined refractive index anisotropy and including plural light modulation areas which differ in responsiveness to an electric field generated by electrodes; a polarization layer which is disposed on a front side of the light modulation layer, on which side external light enters, and which shuts out light other than light whose polarization direction is a predetermined polarization direction; a reflection layer disposed on a back side of the light modulation layer; and a phase retardation layer which is disposed between the polarization layer and the light modulation layer, which creates a predetermined phase difference between incident light and reflected light, and which polarizes the reflected light in a direction different from the predetermined polarization direction, the external light passing through the polarization layer and the incident light being generated, the incident light being reflected from the reflection layer and the reflected light being generated, wherein: when the electric field is not generated, the light modulation layer transmits the reflected light; and when the electric field is generated, the light modulation layer scatters the reflected light.

(2) The display device according to (1) further including: a first light source which makes light enter the light modulation layer from a side of the light modulation layer; and a first light source drive section which drives the first light source, wherein: when the first light source drive section turns on the first light source, light emitted from the first light source enters the light modulation layer, and the electric field is not generated, the light modulation layer transmits the light emitted from the first light source; and when the first light source drive section turns on the first light source, light emitted from the first light source enters the light modulation layer, and the electric field is generated, the light modulation layer scatters the light emitted from the first light source.

(3) The display device according to (2) further including an illumination detection section which detects ambient illumination, wherein the first light source drive section controls the driving of the first light source according to illumination detected by the illumination detection section.

(4) The display device according to (2) or (3) further including an electrode drive section which acquires an image signal including color information for a pixel, which is a unit for display, and which drives electrodes corresponding to the pixel on the basis of the image signal, wherein when the first light source is on, the electrode drive section drives the electrodes corresponding to the pixel on the basis of luminance of the pixel obtained from the first light source and the image signal for the pixel.

(5) The display device according to (4), wherein the electrode drive section corrects at least one of drive voltage to be applied to the electrodes and drive time obtained from the image signal on the basis of an amount of a decrease in the luminance of the pixel obtained from the first light source which is caused by an increase in distance from the first light source and drives the electrodes.

(6) The display device according to (4), wherein the electrode drive section corrects a gradation value included in the image signal on the basis of an amount of a decrease in the luminance of the pixel obtained from the first light source which is caused by an increase in distance from the first light source and drives the electrodes.

(7) The display device according to (4), wherein: the electrodes differ in distance from the first light source; and an area of a first electrode is larger than an area of a second electrode which is closer to the first light source than the first electrode.

(8) The display device according to any of (4) to (7), wherein the electrode drive section: stores in advance luminance information corresponding to the luminance of the pixel obtained from the first light source; and drives the electrodes by the use of the luminance information.

(9) The display device according to (1) further including: a second light source which makes light enter the polarization layer from a front side; a light guide plate which transmits light emitted from the second light source to an entire surface of the polarization layer; and a second light source drive section which drives the second light source.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a first substrate including a plurality of reflection electrodes on a front side of the first substrate, the plurality of reflection electrodes including a first reflection electrode and a second reflection electrode which is farther away from a light source than the first reflection electrode;
a second substrate including a transparent electrode on a back side of the second substrate;
a light modulation layer which includes a polymer dispersed liquid crystal layer containing a liquid crystalline monomer and liquid crystal molecules dispersed in the liquid crystalline monomer, the light modulation layer being disposed between the plurality of reflection electrodes and the transparent electrode;

a drive section driving the plurality of reflection electrodes and the transparent electrode, wherein an application time of a first drive voltage applied between the transparent electrode and the first reflection electrode is shorter than an application time of a second drive voltage applied between the transparent electrode and the second reflection electrode.

2. The display device according to claim 1, further comprising a polarization layer which is disposed on a front side of the second substrate.

3. The display device according to claim 2, further comprising a phase retardation layer disposed between the polarization layer and the second substrate, which creates a predetermined phase difference between incident light and reflected light, and which polarizes the reflected light in a direction different from a predetermined polarization direction, the external light passing through the polarization layer and becoming the incident light, the incident light being reflected from the plurality of reflection electrodes and becoming the reflected light.

4. The display device according to claim 2, further comprising an illumination detection section which detects ambient illumination, wherein:

when the illumination detected by the illumination detection section is more than a predetermined value, a light source drive section turns off the light source; and when the illumination detected by the illumination detection section is less than the predetermined value, the light source drive section turns on the light source.

5. The display device according to claim 3, further comprising an illumination detection section which detects ambient illumination, wherein:

when the illumination detected by the illumination detection section is more than a predetermined value, a light source drive section turns off the light source; and when the illumination detected by the illumination detection section is less than the predetermined value, the light source drive section turns on the light source.

6. The display device according to claim 4, wherein an electrode drive section corrects a gradation value included in an image signal supplied to the electrode drive section on the basis of an amount of a decrease in the luminance which is caused by an increase in distance from the light source and drives the electrodes.

7. The display device according to claim 1, wherein an area of the first reflection electrode is smaller than an area of the second reflection electrode.

8. The display device according to claim 6, wherein the electrode drive section:

stores in advance luminance information corresponding to the luminance; and drives the electrodes by the use of the luminance information.

* * * * *